E. A. STOREY.
NON-PUNCTURABLE PNEUMATIC TIRE.
APPLICATION FILED JAN. 18, 1908.
910,094.
Patented Jan. 19, 1909.
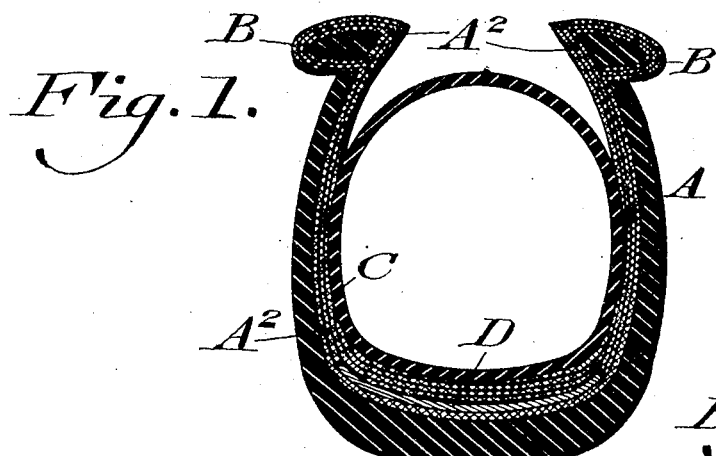
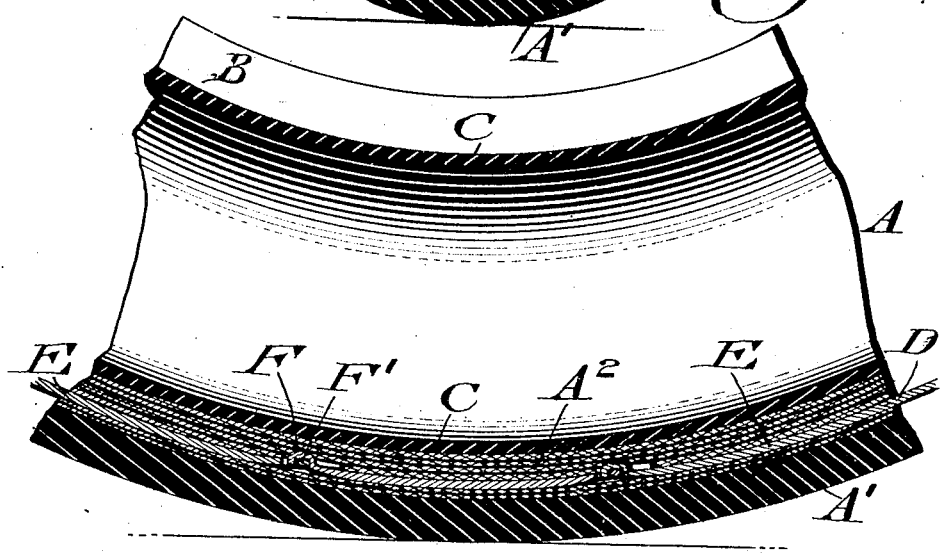
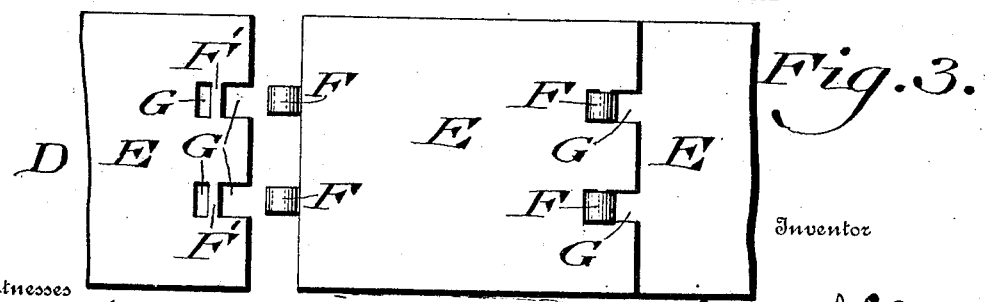

UNITED STATES PATENT OFFICE.

EDWIN A. STOREY, OF PHILADELPHIA, PENNSYLVANIA.

NON-PUNCTURABLE PNEUMATIC TIRE.

No. 910,094.

Specification of Letters Patent.

Patented Jan. 19, 1909.

Application filed January 18, 1908. Serial No. 411,546.

*To all whom it may concern:*

Be it known that I, EDWIN A. STOREY, a citizen of the United States, residing in the city and county of Philadelphia, State of Pennsylvania, have invented a new and useful Non-Puncturable Pneumatic Tire, of which the following is a specification.

My invention consists of a pneumatic tire provided with means for preventing puncturing of the pneumatic tube thereof, the same embodying a mail of non-puncturable material inclosed in the shoe of the tire and serving to guard said tube.

It also consists in forming the mail of articulated plates, thus rendering the mail flexible or pliable so as to yield when subjected to the load of the vehicle, thus obviating breaking or fracturing of the same.

It also consists of means for closing the joints of adjacent plates without affecting the articulation of the same.

For the purpose of explaining my invention, the acompanying drawing illustrates a satisfactory reduction of the same to practice, but the important instrumentalities thereof may be varied.

Figure 1 represents a transverse section of a pneumatic tire embodying the invention. Fig. 2 represents a section of a portion of the same in the annular direction thereof. Fig. 3 represents a plan view of the mail employed.

Similar letters of reference indicate corresponding parts in the figures.

Referring to the drawings:—A designates the shoe of the tire, the same being composed in part of a body A' of soft rubber, and layers A² of rubber cloth, and having on its inner portion the shoulders B for attachment to the felly. Within the shoe is the tube C, which is adapted to be inflated, the effect of which is communicated to the shoe so as to effectively tighten the same.

D designates a mail, preferably of metal, which is inclosed in the shoe and extends in the circular direction of the same, so as to guard the tube C from puncture, the same being formed of a series of plates E, which are provided respectively with hooks F and cross bars F', the former being adapted to engage the latter, whereby the plates are connected one with the other and their joints articulate, by which provision the mail is flexible in its nature and so properly yields when the tread of the wheel touches the roadway, and thus as it is subjected to inward pressure it is prevented from being fractured and rendered useless.

In order to prevent gaps between the ends of the plates which otherwise might permit the passage therethrough of a nail or other object, the cross-bars F' are set back from the edges of the plate and occupy slots G in said edges, so that the hooks F engage said cross-bars some distance from said edges, by which provision the edge of one plate overlaps the edge of the adjacent plate, and thus the joint of the two plates is covered without, however, affecting the articulation of the plates, the effect of which is evident.

Upon reference to Fig. 3, it will be noted that the slot G is upon opposite sides of the cross bar F. By this provision the hooks F which are mounted on said cross-bars have their heads movable in the inner slot G, and the shanks of said hook movable on the outer slot G, said shank thus has a free play of said outer slot and causes the greatest freedom of articulation of adjacent plates E.

In order to guard the tube from frictional and consequently injurious action of the mail, the latter is interposed between the layers A² of the shoe, and thus covered by the latter, preventing direct contact of said shoe with said tube.

Having thus described my invention, what I claim as new and desire to secure by Letters Patent, is:—

1. In a pneumatic tire, a shoe, and means within the same for rendering the pneumatic tube thereof non-puncturable, the said means comprising plates, one end of each of which is provided with transverse slots extending upon opposite sides of a transverse cross bar and the other end having hooks, said plates having their adjacent ends overlapped with the hooks mounted on said cross bar with their heads movable in the inner slot and their shanks movable in the outer slots, whereby said shanks have free play of the outer slots and greatest freedom of articulation of the adjacent plates is provided.

2. Means for rendering the pneumatic tube of a tire non-puncturable, the same comprising plates having their adjacent ends overlapped, said overlapped ends provided the one with hooks projecting beyond said ends and the other with slots open at their outer ends and extending inward from the end of the plate and having cross bars dividing said slots back from the outer ends of the slots and receiving said hooks, the latter being disposed in said slots.

EDWIN A. STOREY.

Witnesses:
　JOHN A. WIEDERSHEIM,
　HARRY C. DALTON.